G. HONOLD.
ELECTROMAGNETICALLY OPERATED INTERRUPTER IGNITING DEVICE FOR EXPLOSION MOTORS.
APPLICATION FILED AUG. 7, 1906.

920,745.

Patented May 4, 1909.

2 SHEETS—SHEET 1.

WITNESSES
M. Taylor
R. M. Elliott

INVENTOR
Gottlob Honold
by George Meassid
ATTORNEYS

G. HONOLD.
ELECTROMAGNETICALLY OPERATED INTERRUPTER IGNITING DEVICE FOR EXPLOSION MOTORS.
APPLICATION FILED AUG. 7, 1906.

920,745. Patented May 4, 1909.
2 SHEETS—SHEET 2.

WITNESSES
M. Taylor.
R. M. Elliott

INVENTOR
Gottlob Honold
by George M. Massie
ATTORNEYS

UNITED STATES PATENT OFFICE.

GOTTLOB HONOLD, OF STUTTGART, GERMANY.

ELECTROMAGNETICALLY-OPERATED INTERRUPTER IGNITING DEVICE FOR EXPLOSION-MOTORS.

No. 920,745.     Specification of Letters Patent.     Patented May 4, 1909.

Application filed August 7, 1906. Serial No. 329,570.

*To all whom it may concern:*

Be it known that I, GOTTLOB HONOLD, engineer, a subject of the German Emperor, residing at 11 Hoppenlaustrasse, Stuttgart, Germany, have invented certain new and useful Improvements in Electromagnetically-Operated Interrupter Igniting Devices for Explosion-Motors; and I do hereby declare the following to be full, clear, and exact description of the invention, such as will enable others skilled in the art to which it appertains to make and use the same.

The invention relates to electromagnetically actuated sparking devices for the ignition of explosion engines. In such devices it is very important to obtain the maximum of magnetic effect which can be produced within an exceedingly limited space and with a loss of electrical energy as small as possible, because the latter reduces the effect of the igniting sparks, particularly at slow speeds.

The invention consists in giving the core of the electromagnet such a shape as to produce the best effect by disposing both poles and the armature inside of the coil, one side of the pivoted armature forming a bridge between the poles and the other side forming an extension which constitutes the interrupter of the circuit for producing the sparks. With regard to the magnetic loss it is of advantage to make the gap between the poles as small as possible. According to this invention I make the opposite polar- and armature-surfaces nearly as long as the armature itself, consequently the cross-section for the passing of the lines of force will be much increased. The exterior circuit of the lines of force may be formed by an iron cylinder which almost completely surrounds the windings of the coil.

The invention also comprises certain modifications by which the magnetic resistance between the poles and the armature is further reduced.

Of the accompanying drawings Figures 1, 2, 3, 4 and 5 are longitudinal sections showing the igniting apparatus according to my invention and Figs. 6, 7, 8, 9 and 10 are cross sections on lines 6—6, 7—7, 8—8, 9—9 and 10—10 of the Figs. 1 to 5 respectively.

Figure 1:
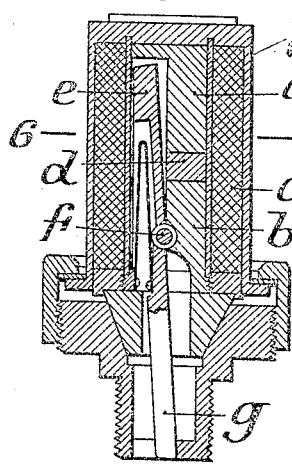
Figure 2:
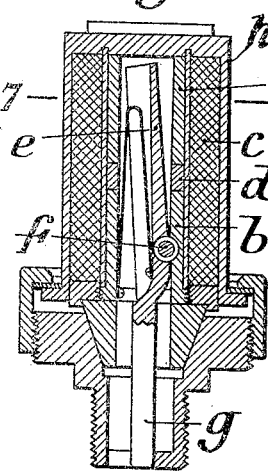
Figure 3:
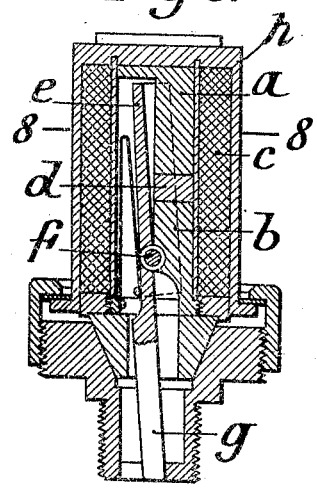
Figure 6:
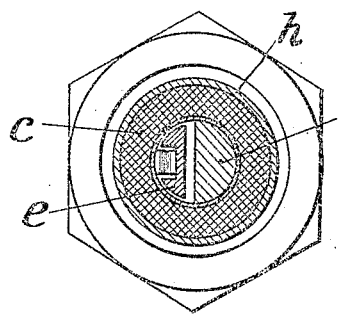
Figure 7:
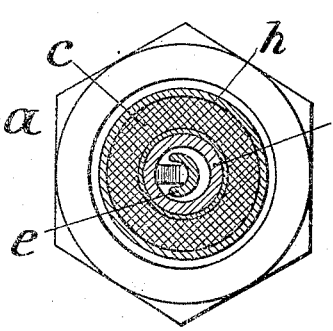
Figure 8:
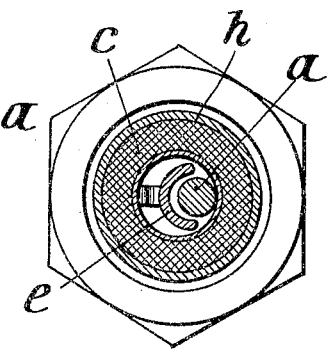
Figure 4:
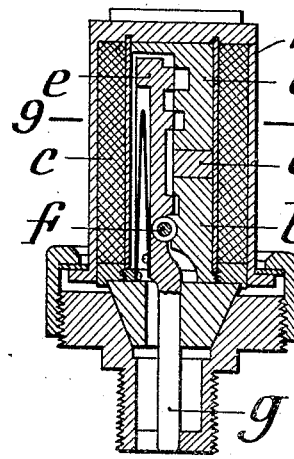
Figure 5:
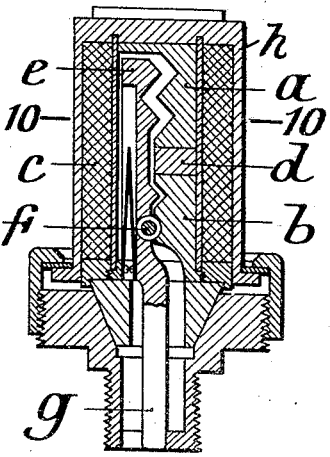
Figure 9:
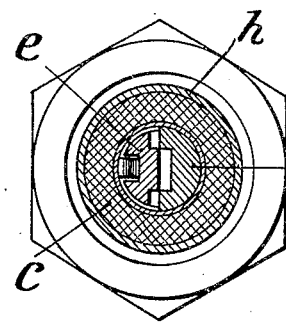
Figure 10:
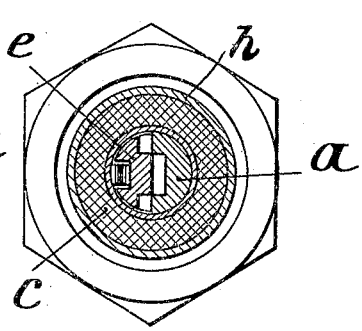

In Fig. 1 $a$ is the one pole and $b$ the second pole of the magnet. These poles approach each other within the wire coil to within a small distance, the space $d$ between the poles being filled either by air or by a non-magnetic material. The armature $e$, which is pivotally mounted at $f$, has an extension $g$ which constitutes the interrupter of the circuit for producing the sparks. Figs. 2 and 3 show similar constructions, but with the difference that the polar surfaces are formed curved, for affording a greater surface for the passage of the lines of force. The same result is obtained in the constructions shown in Figs. 4 and 5 by forming the opposite polar and armature surfaces with indentations of any suitable configuration. Outside the coil $c$ is placed an iron casing or jacket, indicated at $h$, the outer end of said casing being closed as shown in the drawings. This casing forms the exterior portion of the magnetic circuit for the lines of force, thereby producing an iron-clad electro-magnet, whose poles $a$, $b$, are within the coil, the armature $e$ being arranged to form a bridge from one pole to the other, whereby the magnetic circuit is kept as short as possible.

Having thus fully described my invention what I claim is:

1. In an electromagnetic igniter, the combination, with an electro-magnet having its poles arranged inside the coil, of a pivoted armature arranged to form a bridge from one pole to the other, and a movable electrode operated by the armature.

2. In an electromagnetic igniter, the combination, with an electro-magnet having its poles arranged within the coil, of an armature pivoted to one pole and arranged to form a bridge from one pole to the other, and a movable electrode operated by the armature.

3. In an electromagnetic interrupter, the combination, with an electro-magnet having its poles arranged within the coil, of a pivoted armature arranged to form a bridge from one pole to the other, a movable electrode arm carried by the armature, and a fixed electrode with which said movable electrode contacts.

4. In an electromagnetic igniter, the combination, with an iron clad electro-magnet having its poles within the coil, of a pivoted armature arranged to form a bridge from one pole to the other, and a movable electrode operated by the armature.

5. In an electromagnetic igniter, the combination, with an electro-magnet having a jacket of magnetic material and having its poles inside the coil, of an interrupting lever pivoted to one pole of the magnet and provided with an arm forming an armature arranged to bridge the poles, the armature and one pole of the magnet having mating indented surfaces.

6. In an electro-magnetic igniter for explosion engines, the combination, with the core of an electro-magnet, the iron of which almost completely incloses the winding, said electro-magnet having pole pieces, of an interrupting lever pivoted on one pole-piece of the said electro-magnet and having an arm that forms the armature of the magnet and bridges the gap between the pole-pieces, said arm being provided with indentations and the pole-pieces opposite said arm being provided with similar indentations registering with the intervals between the indentations on the said arm.

In testimony whereof I have hereunto affixed my signature in the presence of two witnesses.

GOTTLOB HONOLD.

Witnesses:
RUDOLF KLEIN,
ERNST ENTEMAN.